US012331675B2

(12) United States Patent
Shuto et al.

(10) Patent No.: US 12,331,675 B2
(45) Date of Patent: Jun. 17, 2025

(54) OPPOSED-PISTON ENGINE

(71) Applicant: MITSUBISHI HEAVY INDUSTRIES, LTD., Tokyo (JP)

(72) Inventors: Shintaro Shuto, Tokyo (JP); Kengo Tanaka, Tokyo (JP); Keita Suzuki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/278,748

(22) PCT Filed: Mar. 22, 2022

(86) PCT No.: PCT/JP2022/012955
§ 371 (c)(1),
(2) Date: Aug. 24, 2023

(87) PCT Pub. No.: WO2022/202739
PCT Pub. Date: Sep. 29, 2022

(65) Prior Publication Data
US 2024/0151177 A1 May 9, 2024

(30) Foreign Application Priority Data
Mar. 26, 2021 (JP) ................. 2021-053446

(51) Int. Cl.
*F02B 75/28* (2006.01)
*F02B 23/02* (2006.01)
*F02B 25/08* (2006.01)

(52) U.S. Cl.
CPC .............. *F02B 25/08* (2013.01); *F02B 23/02* (2013.01); *F02B 75/28* (2013.01)

(58) Field of Classification Search
CPC ..... F02B 2075/025; F02B 25/08; F02B 75/28
(Continued)

(56) References Cited

U.S. PATENT DOCUMENTS

2013/0014718 A1   1/2013  Shen et al.
2013/0036999 A1*  2/2013  Levy ................. F02B 75/243
                                              123/294
(Continued)

FOREIGN PATENT DOCUMENTS

JP    2001-73780 A      3/2001
JP    2009138718 A  *   6/2009
(Continued)

OTHER PUBLICATIONS

International Preliminary Report on Patentability and English translation of the Written Opinion of the International Searching Authority for International Application No. PCT/JP2022/012955, dated Oct. 5, 2023.
(Continued)

*Primary Examiner* — George C Jin
*Assistant Examiner* — Teuta B Holbrook
(74) *Attorney, Agent, or Firm* — Birch, Stewart, Kolasch & Birch, LLP

(57) ABSTRACT

An opposed-piston engine includes: a cylinder having a scavenging port on one side in an axial direction and an exhaust port on another side in the axial direction, a scavenging-side piston disposed inside the cylinder on the one side in the axial direction, an exhaust-side piston disposed inside the cylinder on the other side in the axial direction; and at least one fuel injection device configured to inject fuel between the scavenging-side piston and the exhaust-side piston inside the cylinder. A top surface of the exhaust-side piston is formed in a flat shape, a top surface of the scavenging-side piston has a scavenging-side cavity with a predetermined cavity volume, and the at least one fuel injection device includes at least one scavenging-side fuel injection device having a central axis inclined to the one side
(Continued)

in the axial direction toward an inner side in a radial direction of the cylinder.

3 Claims, 7 Drawing Sheets

(58) Field of Classification Search
USPC .................. 123/193.6, 51 BA, 50 B, 51 BD
See application file for complete search history.

(56) References Cited

U.S. PATENT DOCUMENTS

| 2013/0146021 A1* | 6/2013 | Hofbauer | F02B 17/005 |
| | | | 123/294 |
| 2014/0014063 A1* | 1/2014 | Redon | F02B 23/0621 |
| | | | 123/295 |
| 2017/0254261 A1* | 9/2017 | Morton | F01B 7/02 |

FOREIGN PATENT DOCUMENTS

| JP | 2013-24240 A | 2/2013 | |
| JP | 2013-525684 A | 6/2013 | |
| JP | 2014-517195 A | 7/2014 | |
| WO | WO-2011139332 A2 * | 11/2011 | ............... F01B 7/02 |
| WO | WO 2012/158756 A1 | 11/2012 | |

OTHER PUBLICATIONS

International Search Report for International Application No. PCT/JP2022/012955, dated Jun. 7, 2022.

* cited by examiner

OPPOSED-PISTON ENGINE

TECHNICAL FIELD

The present disclosure relates to an opposed-piston engine.

The present application claims priority based on Japanese Patent Application No. 2021-053446 filed on Mar. 26, 2021, the entire content of which is incorporated herein by reference.

BACKGROUND ART

Two-stroke diesel engines include opposed-piston engines, in which two pistons are placed opposite each other inside one cylinder, forming a combustion chamber between the two pistons (for example, Patent Document 1). In an opposed-piston engine, during one reciprocating motion of the piston, combustion gas in the cylinder is discharged through an exhaust port formed on the cylinder wall in the exhaust process, and air is taken into the cylinder through a scavenging port formed on the cylinder wall in the scavenging process. The scavenging port formed on the cylinder wall may be inclined to form a swirl flow (swirl) of the air taken in through the scavenging port, which enhances the effect of scavenging and exhaust gas replacement.

Patent document 1 discloses that a doughnut-shaped combustion space is formed by the top surfaces of two pistons facing each other, and fuel is injected into this combustion space from a fuel injection device disposed on the cylinder wall. This fuel injection device injects fuel along the radial direction of the cylinder in a cross-section along the axial direction of the cylinder.

CITATION LIST

Patent Literature

Patent Document 1: JP2013-24240A

SUMMARY

Problems to be Solved

In an opposed-piston engine, fuel is injected from a fuel injection device disposed on the cylinder surface. The fuel injected into the cylinder may flow along the swirl flow formed in the cylinder and burn in an outer peripheral region of the fuel chamber. The spread of the combustion flame to the outer peripheral region of the combustion chamber may increase the heat load on an outer peripheral portion of the piston, which is difficult to cool from the inside of the piston. The increased heat load on the outer peripheral portion of the piston may cause problems such as piston sliding failure due to deterioration in piston lubrication (degradation of lubricant oil) and piston damage due to thermal stresses on the piston.

Of the two pistons in an opposed-piston engine, a scavenging-side piston, which is the piston closer to the scavenging port, has its top surface cooled by low-temperature air (cold gas) during the scavenging process, while an exhaust-side piston, which is the piston closest to the exhaust port, is still exposed to high-temperature exhaust gas during the exhaust process. FIG. 6 is an explanatory diagram for describing the temperature distribution of gas facing the top surface of the exhaust-side piston of an opposed-piston engine according to a comparative example. FIG. 7 is an explanatory diagram for describing the temperature distribution of gas facing the top surface of the scavenging-side piston of the opposed-piston engine according to the comparative example. In FIGS. 6 and 7, the scavenging-side piston 03 and the exhaust-side piston 04 have the same shape. As shown in FIGS. 6 and 7, the temperature of gas facing the top surface 041 of the exhaust-side piston 04 is higher than the temperature of gas facing the top surface 031 of the scavenging-side piston 03. Therefore, there is concern that the heat load on the outer peripheral portion 043 of the exhaust-side piston 04 may lead to problems such as damage to the exhaust-side piston.

In view of the above, an object of at least one embodiment of the present disclosure is to provide an opposed-piston engine that can reduce the heat load on the exhaust-side piston.

Solution to the Problems

An opposed-piston engine according to an embodiment of the present disclosure includes: a cylinder having a scavenging port on one side in an axial direction and an exhaust port on another side in the axial direction; a scavenging-side piston disposed inside the cylinder on the one side in the axial direction; an exhaust-side piston disposed inside the cylinder on the other side in the axial direction; and at least one fuel injection device configured to inject fuel between the scavenging-side piston and the exhaust-side piston inside the cylinder. A top surface of the exhaust-side piston is formed in a flat shape, a top surface of the scavenging-side piston has a scavenging-side cavity with a predetermined cavity volume, and the at least one fuel injection device includes at least one scavenging-side fuel injection device having a central axis inclined to the one side in the axial direction toward an inner side in a radial direction of the cylinder.

Advantageous Effects

At least one embodiment of the present disclosure provides an opposed-piston engine that can reduce the heat load on the exhaust-side piston.

DETAILED DESCRIPTION

Figure 1:
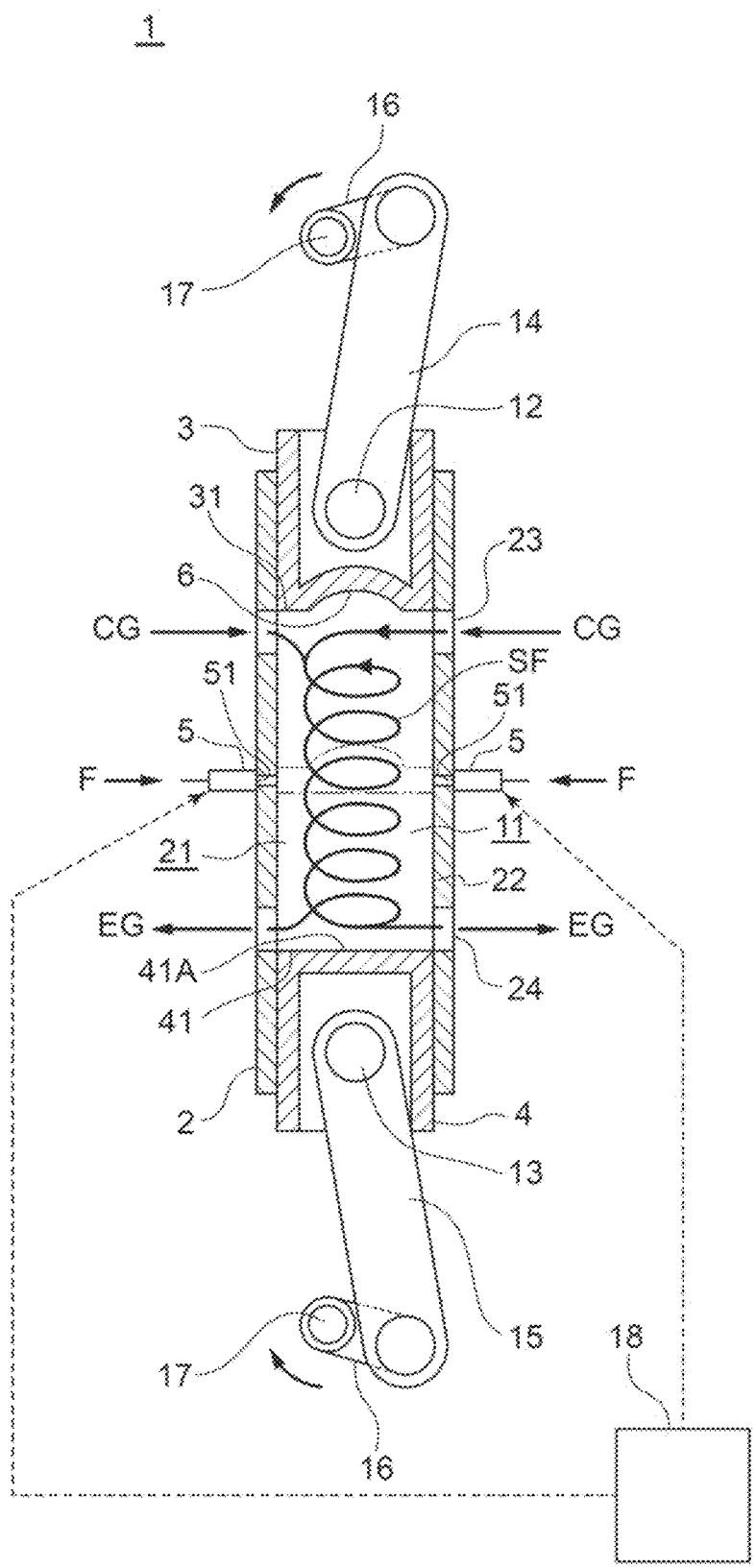
FIG. 1 is a schematic cross-sectional view schematically showing the configuration of an opposed-piston engine according to an embodiment of the present disclosure.

Embodiments of the present disclosure will be described below with reference to the accompanying drawings. It is intended, however, that unless particularly identified, dimensions, materials, shapes, relative positions, and the like of components described in the embodiments shall be interpreted as illustrative only and not intended to limit the scope of the present disclosure.

For instance, an expression of relative or absolute arrangement such as "in a direction", "along a direction". "parallel". "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The same features can be indicated by the same reference numerals and not described in detail.

(Opposed-Piston Engine)

FIG. 1 is a schematic cross-sectional view schematically showing the configuration of an opposed-piston engine according to an embodiment of the present disclosure. As shown in FIG. 1, an opposed-piston engine 1 according to some embodiments includes a cylinder 2 having a cylinder bore 21 extending along the axial direction inside, a scavenging-side piston 3 disposed inside the cylinder 2 on one side (upper side in FIG. 1) in the axial direction, an exhaust-side piston 4 disposed inside the cylinder 2 on the other side (lower side in FIG. 1) in the axial direction, and at least one fuel injection device (fuel injection valve) 5 configured to inject fuel between the scavenging-side piston 3 and the exhaust-side piston 4 inside the cylinder 2. Hereafter, the one side (upper side in FIG. 1) in the axial direction of the cylinder 2 is defined as the scavenging side, and the other side (lower side in FIG. 1) in the axial direction of the cylinder 2 is defined as the exhaust side.

The cylinder 2 has an inner surface 22 with a cylinder bore 21. At least one (in the illustrated example, a plurality of) scavenging port 23 is formed on the inner surface 22 of the cylinder 2 on the scavenging side. At least one (in the illustrated example, a plurality of) exhaust port 24 is formed on the inner surface 22 of the cylinder 2 on the exhaust side. The scavenging ports 23 are arranged at intervals in the circumferential direction of the cylinder 2. The exhaust ports 24 are arranged at intervals in the circumferential direction of the cylinder 2.

Each of the scavenging ports 23 is shaped to introduce combustion gas CG (compressed air in the illustrated example) from the outside to the inside of the cylinder 2 in a direction inclined to one side in the circumferential direction with respect to the radial direction of the cylinder 2. In an embodiment, each of the scavenging ports 23 extends in a direction inclined at a predetermined angle to one side in the circumferential direction with respect to the radial direction of the cylinder 2. The combustion gas CG introduced into the cylinder 2 (i.e., cylinder bore 21) through the scavenging port 23 forms a swirl flow SF (swirl) inside the cylinder 2. Thereby, the combustion gas CG introduced into the cylinder 2 through the scavenging port 23 flows to the exhaust side while swirling. By forming the swirl flow SF inside the cylinder 2, in the scavenging process and the exhaust process, it is possible to enhance the effect of scavenging and exhaust gas replacement in the cylinder bore 21, and it is possible to enhance the effect of promoting the combustion of injected fuel.

The scavenging-side piston 3 is arranged to reciprocate along the axial direction of the cylinder 2 on the scavenging side of the cylinder bore 21. The exhaust-side piston 4 is arranged to reciprocate along the axial direction of the cylinder 2 on the exhaust side of the cylinder bore 21. A combustion chamber 11 is formed between the top surface 31 of the scavenging-side piston 3 and the top surface 41 of the exhaust-side piston 4 in the cylinder bore 21. In other words, the top surface 31 of the scavenging-side piston 3 faces the top surface 41 of the exhaust-side piston 4 with the combustion chamber 11 interposed therebetween.

In FIG. 1, the scavenging-side piston 3 and the exhaust-side piston 4 at bottom dead center are indicated by the solid lines, and the top surface 31 of the scavenging-side piston 3 and the top surface 41 of the exhaust-side piston 4 at top dead center are indicated by the dashed-two dotted lines.

The scavenging-side piston 3 and the exhaust-side piston 4 reciprocate inside the cylinder 2 in synchronization with each other. The scavenging-side piston 3 is configured to reciprocate between top dead center (the position closest to the exhaust-side piston 4) and bottom dead center (the position farthest from the exhaust-side piston 4) of the scavenging-side piston 3. The exhaust-side piston 4 is configured to reciprocate between top dead center (the position closest to the scavenging-side piston 3) and bottom dead center (the position farthest from the scavenging-side piston 3) of the exhaust-side piston 4. The scavenging-side piston 3 and the exhaust-side piston 4 may reach top dead center and bottom dead center at the same time, or may reach top dead center and bottom dead center at different times.

In the illustrated embodiment, as shown in FIG. 1, the scavenging-side piston 3 is connected to one end of a scavenging-side connecting rod 14 via a scavenging-side piston pin 12, and the other end of the scavenging-side connecting rod 14 is connected to a crankshaft 16. Similarly, the exhaust-side piston 4 is connected to one end of an exhaust-side connecting rod 15 via an exhaust-side piston pin 13, and the other end of the exhaust-side connecting rod 15 is connected to the crankshaft 16. As the crankshaft 16 rotates around a rotational shaft 17, the scavenging-side piston 3 and the exhaust-side piston 4 synchronize with each other and reciprocate inside the cylinder 2 so that their sliding directions are opposite each other in the axial direction of the cylinder 2.

The fuel injection device 5 is disposed on the inner surface 22 of the cylinder 2. The fuel injection device 5 has at least one injection hole 51 for injecting fuel F into the cylinder bore 21. The fuel injection device 5 injects fuel into the cylinder bore 21 when the crank angle (the angle of rotation of the crankshaft 16) reaches a predetermined angle (for example, when the scavenging-side piston 3 or the exhaust-side piston 4 reaches top dead center).

The opposed-piston engine 1 compresses and heats the combustion gas CG introduced into the cylinder 2 through the scavenging port 23 by the scavenging-side piston 3 and the exhaust-side piston 4 to a temperature higher than the ignition point of the fuel F. By injecting the fuel F from the fuel injection device 5 to the compressed and heated combustion gas CG, the fuel F is self-ignited. The self-ignition of the fuel F forms a combustion flame. Due to the expansion of the combustion gas caused by the self-ignition, the scavenging-side piston 3 and the exhaust-side piston 4 are pushed away from each other. Further, the reciprocating motion of the scavenging-side piston 3 and the exhaust-side piston 4 is transmitted to the crankshaft 16 and converted into rotational force (power) by the crankshaft 16.

Each of the scavenging ports 23 is formed on the scavenging side of the top surface 31 of the scavenging-side piston 3 at top dead center and on the exhaust side of the top surface 31 of the scavenging-side piston 3 at bottom dead center. Each of the exhaust ports 24 is formed on the exhaust side of the top surface 41 of the exhaust-side piston 4 at top dead center and on the scavenging side of the top surface 41 of the exhaust-side piston 4 at bottom dead center.

By sliding the top surface 31 of the scavenging-side piston 3 to the scavenging side over each scavenging port 23, the combustion gas CG can be supplied to the cylinder bore 21 through each scavenging port 23. By sliding the top surface 41 of the exhaust-side piston 4 to the exhaust side over each exhaust port 24, the exhaust gas EG can be discharged from the cylinder bore 21 through each exhaust port 24. Since the combustion gas CG supplied to the cylinder bore 21 is compressed by a turbocharger (not shown), the pressure difference between the scavenging port 23 and the exhaust port 24 causes the supply of combustion gas CG to the cylinder bore 21 and the discharge of exhaust gas EG from the cylinder bore 21.

First Embodiment

Figure 2:
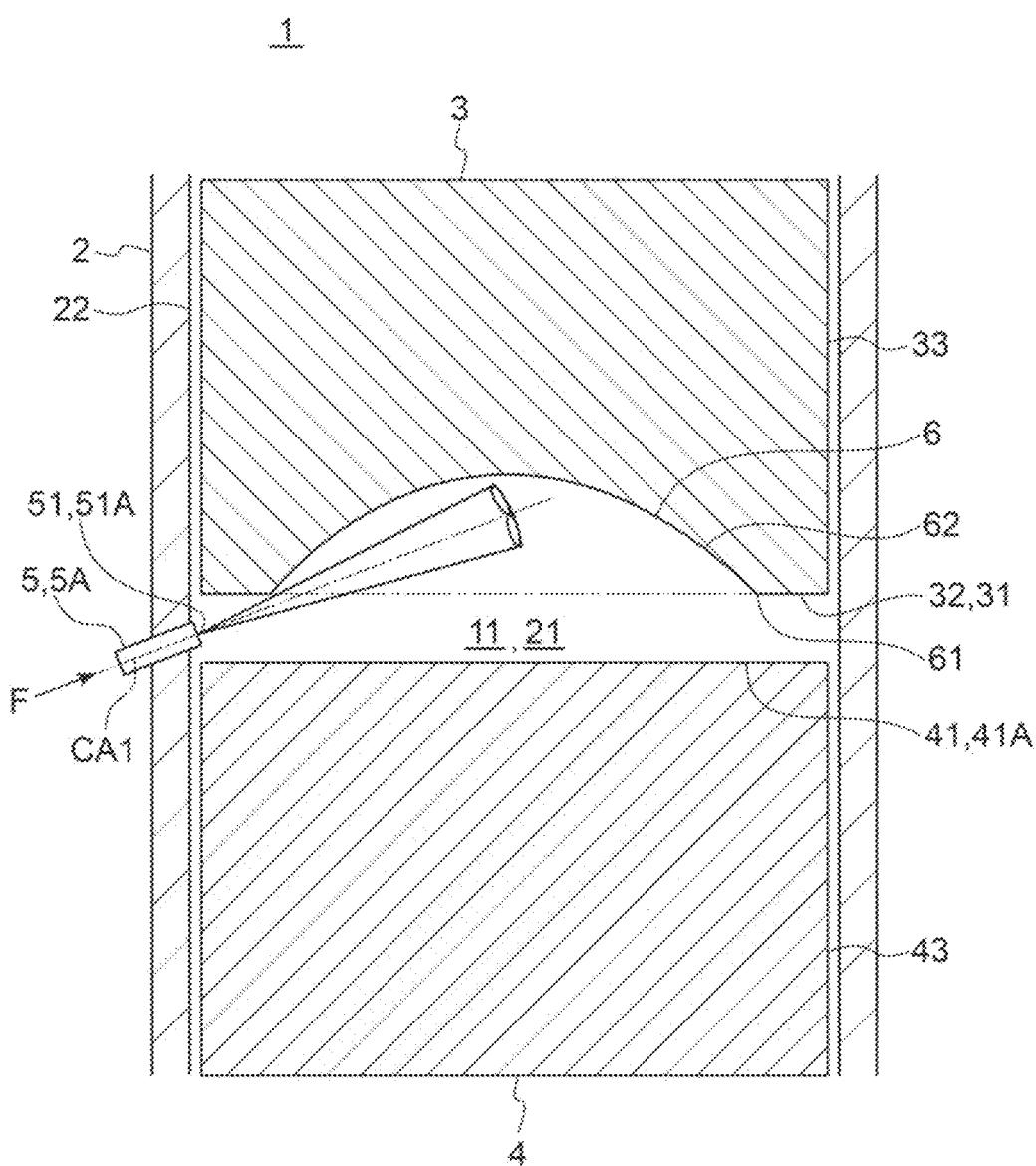
FIG. 2 is a schematic cross-sectional view schematically showing the vicinity of a combustion chamber of an opposed-piston engine according to the first embodiment of the present disclosure.

FIG. 2 is a schematic cross-sectional view schematically showing the vicinity of a combustion chamber of an opposed-piston engine according to the first embodiment of the present disclosure.

As shown in FIG. 2, the opposed-piston engine 1 according to some embodiments includes the above-described cylinder 2, the above-described scavenging-side piston 3, the above-described exhaust-side piston 4, and the above-described at least one fuel injection device 5. The top surface 41 of the exhaust-side piston 4 is formed in a flat shape. The top surface 31 of the scavenging-side piston 3 has a scavenging-side cavity 6 with a predetermined cavity volume. The at least one fuel injection device 5 includes a scavenging-side fuel injection device 5A having the central axis CA1 inclined to the scavenging side (the one side in the axial direction of the cylinder 2) toward the inner side in the radial direction of the cylinder 2.

In the illustrated embodiment, the scavenging-side cavity 6 is formed recessed in a central portion of the top surface 31 of the scavenging-side piston 3, and the top surface 31 of the scavenging-side piston 3 includes a scavenging-side outer peripheral edge portion 32 extending from the outer peripheral edge 61 of the scavenging-side cavity 6 toward the outer peripheral side (the outer side in the radial direction of the cylinder 2) along the direction perpendicular to the axial direction of the cylinder 2. The outer peripheral end of the scavenging-side outer peripheral edge portion 32 is connected to one end of an outer peripheral portion 33 of the scavenging-side piston 3 extending along the axial direction of the cylinder 2. The scavenging-side cavity 6 has a concave curved surface 62 whose depth from the outer peripheral edge 61 increases from the outer peripheral edge 61 toward the inner side in the radial direction of the cylinder 2.

In the illustrated embodiment, the top surface 41 of the exhaust-side piston 4 includes a flat surface 41A extending along the direction perpendicular to the axial direction of the cylinder 2. The outer peripheral end of the flat surface 41A is connected to one end of an outer peripheral portion 43 of the exhaust-side piston 4 extending along the axial direction of the cylinder 2. The scavenging-side fuel injection device 5A is disposed on the inner surface 22 of the cylinder 2 so that the central axis CA1 is inclined with respect to the radial direction of the cylinder 2. The scavenging-side fuel injection device 5A injects fuel into the cylinder bore 21 along the extension direction of the central axis CA1. The extension direction of the central axis CA1 is directed to the central portion of the scavenging-side cavity 6.

According to the above configuration, the top surface 41 of the exhaust-side piston 4 is formed in a flat shape, and the top surface 31 of the scavenging-side piston 3 has the scavenging-side cavity 6 with a predetermined cavity volume. Therefore, the combustion chamber 11 formed between the scavenging-side piston 3 and the exhaust-side piston 4 has a larger volume on the scavenging side than on the exhaust side. The fuel injected from the scavenging-side fuel injection device 5A flows to the scavenging side (one side in the axial direction) along the extension direction of the central axis CA1 of the scavenging-side fuel injection device 5A and burns in the scavenging-side cavity 6. By burning the fuel mainly on the scavenging side of the combustion chamber 11, the heat load on the exhaust-side piston 4 can be reduced.

Figure 3:
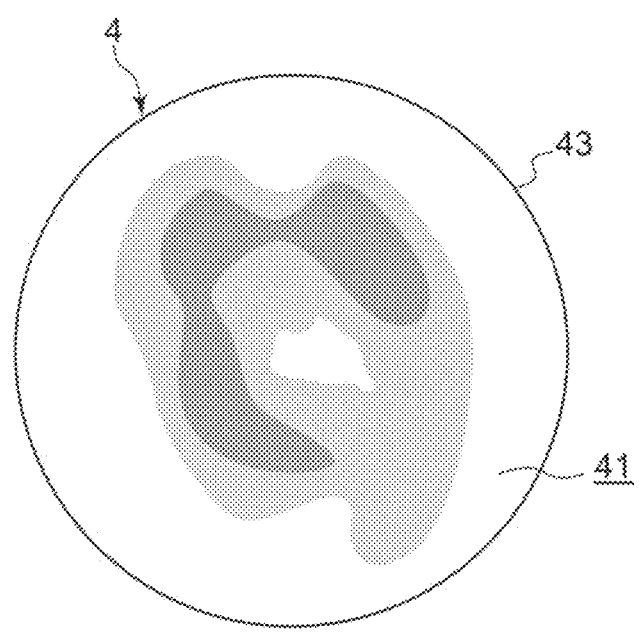
FIG. 3 is an explanatory diagram for describing the temperature distribution of combustion gas facing the top surface of the exhaust-side piston in the first embodiment.
Figure 6:
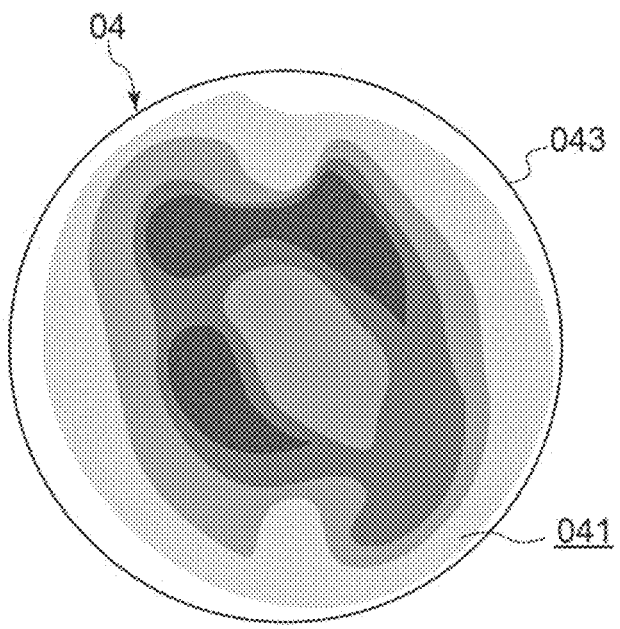
FIG. 6 is an explanatory diagram for describing the temperature distribution of combustion gas facing the top surface of the exhaust-side piston of an opposed-piston engine according to a comparative example.
Figure 7:
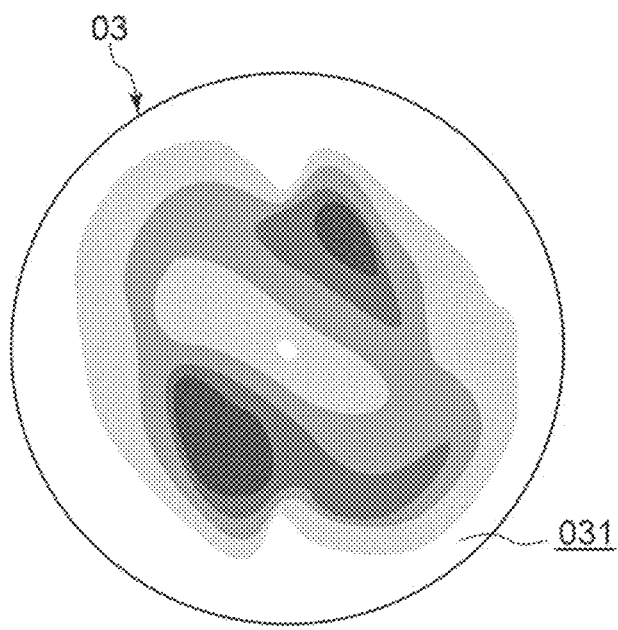
FIG. 7 is an explanatory diagram for describing the temperature distribution of combustion gas facing the top surface of the scavenging-side piston of the opposed-piston engine according to the comparative example.

FIG. 3 is an explanatory diagram for describing the temperature distribution of combustion gas facing the top surface of the exhaust-side piston in the first embodiment. As shown in FIGS. 3 and 6, the temperature of the combustion gas facing the top surface 41 of the exhaust-side piston 4 in the first embodiment is entirely lower than the temperature of the combustion gas facing the top surface 041 of the exhaust-side piston 04 in the comparative example. That is, the exhaust-side piston 4 in the first embodiment has a reduced heat load compared to the exhaust-side piston 04 in the comparative example.

Further, according to the above configuration, since the top surface 41 of the exhaust-side piston 4 is formed in a flat shape, the heat input from the combustion chamber 11 to the top surface 41 of the exhaust-side piston 4 can be reduced. As a result, it is possible to reduce the heat loss of combustion in the combustion chamber 11 and thus suppress a reduction in thermal efficiency of the opposed-piston engine 1.

Second Embodiment

Figure 4:
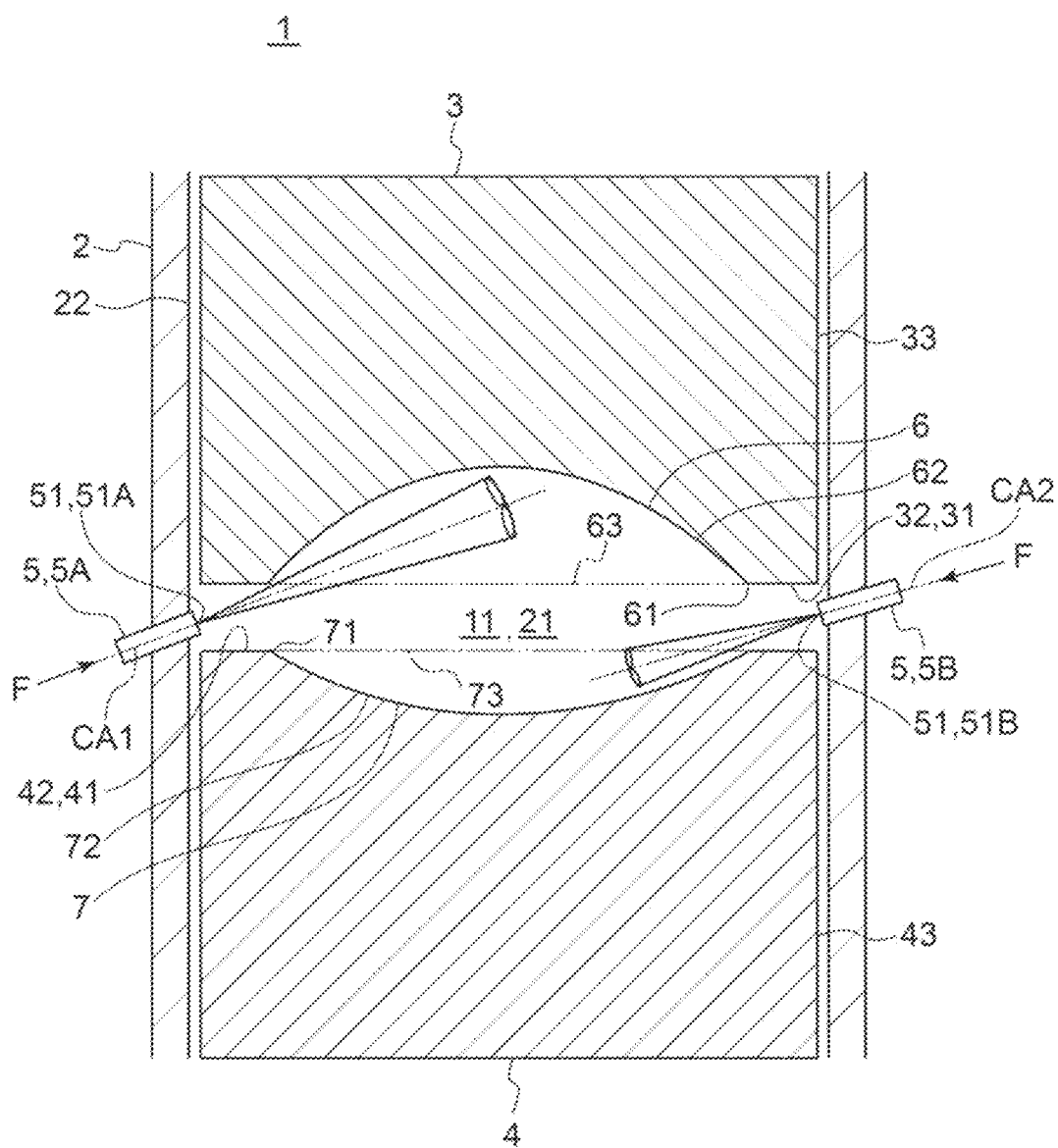
FIG. 4 is a schematic cross-sectional view schematically showing the vicinity of a combustion chamber of an opposed-piston engine according to the second embodiment of the present disclosure.

FIG. 4 is a schematic cross-sectional view schematically showing the vicinity of a combustion chamber of an opposed-piston engine according to the second embodiment of the present disclosure.

As shown in FIG. 4, the opposed-piston engine 1 according to some embodiments includes the above-described cylinder 2, the above-described scavenging-side piston 3, the above-described exhaust-side piston 4, and the above-described at least one fuel injection device 5. The top surface 41 of the exhaust-side piston 4 has an exhaust-side cavity 7 with a predetermined cavity volume. The top surface 31 of the scavenging-side piston 3 has a scavenging-side cavity 6 with a larger cavity volume than the exhaust-side cavity 7. The at least one fuel injection device 5 includes a scavenging-side fuel injection device 5A having the central axis CA1 inclined to the scavenging side (the one side in the axial direction of the cylinder 2) toward the inner side in the radial direction of the cylinder 2.

In the illustrated embodiment, the scavenging-side cavity 6 is formed recessed in a central portion of the top surface 31 of the scavenging-side piston 3, and the top surface 31 of the scavenging-side piston 3 includes a scavenging-side outer peripheral edge portion 32 extending from the outer peripheral edge 61 of the scavenging-side cavity 6 toward the outer peripheral side (the outer side in the radial direction of the cylinder 2) along the direction perpendicular to the axial direction of the cylinder 2. The outer peripheral end of the scavenging-side outer peripheral edge portion 32 is connected to one end of an outer peripheral portion 33 of the scavenging-side piston 3 extending along the axial direction of the cylinder 2. The scavenging-side cavity 6 has a concave curved surface 62 whose depth from the outer peripheral edge 61 increases from the outer peripheral edge 61 toward the inner side in the radial direction of the cylinder 2.

In the illustrated embodiment, the exhaust-side cavity 7 is formed recessed in a central portion of the top surface 41 of the exhaust-side piston 4, and the top surface 41 of the exhaust-side piston 4 includes an exhaust-side outer peripheral edge portion 42 extending from the outer peripheral edge 71 of the exhaust-side cavity 7 toward the outer peripheral side (the outer side in the radial direction of the cylinder 2) along the direction perpendicular to the axial direction of the cylinder 2. The outer peripheral end of the exhaust-side outer peripheral edge portion 42 is connected to one end of an outer peripheral portion 43 of the exhaust-side piston 4 extending along the axial direction of the cylinder 2. The exhaust-side cavity 7 has a concave curved surface 72 whose depth from the outer peripheral edge 71 increases from the outer peripheral edge 71 toward the inner side in the radial direction of the cylinder 2.

The cavity volume of the scavenging-side cavity 6 may be the volume of a three-dimensional shape formed by the concave curved surface 62 and a virtual surface 63 extending along the direction perpendicular to the axial direction of the cylinder 2 and having the outer peripheral edge 61 of the scavenging-side cavity 6 as the outer peripheral edge. Further, the cavity volume of the exhaust-side cavity 7 may be the volume of a three-dimensional shape formed by the concave curved surface 72 and a virtual surface 73 extending along the direction perpendicular to the axial direction of the cylinder 2 and having the outer peripheral edge 71 of the exhaust-side cavity 7 as the outer peripheral edge.

In an embodiment, the cavity volume of the scavenging-side cavity 6 is made larger than the exhaust-side cavity 7 by making the depth (for example, the maximum depth or average depth) of the scavenging-side cavity 6 larger than the exhaust-side cavity 7. Further, in an embodiment, the cavity volume of the scavenging-side cavity 6 is made larger than the exhaust-side cavity 7 by making the diameter dimension of the outer peripheral edge 61 of the scavenging-side cavity 6 larger than the outer peripheral edge 71 of the exhaust-side cavity 7.

In the illustrated embodiment, the scavenging-side fuel injection device 5A is disposed on the inner surface 22 of the cylinder 2 so that the central axis CA1 is inclined with respect to the radial direction of the cylinder 2. The scavenging-side fuel injection device 5A injects fuel into the cylinder bore 21 along the extension direction of the central axis CA1. The extension direction of the central axis CA1 is directed to the central portion of the scavenging-side cavity 6.

According to the above configuration, the cavity volume of the scavenging-side cavity 6 is larger than the cavity volume of the exhaust-side cavity 7. Therefore, the combustion chamber 11 formed between the scavenging-side piston 3 and the exhaust-side piston 4 has a larger volume on the scavenging side than on the exhaust side. The fuel injected from the scavenging-side fuel injection device 5A flows to the scavenging side (one side in the axial direction) along the extension direction of the central axis CA1 of the scavenging-side fuel injection device 5A and burns in the scavenging-side cavity 6. By burning the fuel mainly on the scavenging side of the combustion chamber 11, the heat load on the exhaust-side piston 4 can be reduced. Further, by forming the exhaust-side cavity 7 on the top surface 41 of the exhaust-side piston 4, compared to the case where the top surface 41 of the exhaust-side piston 4 has a flat shape, the fuel can be burned in a shorter time, so that the degree of constant volume of the opposed-piston engine 1 can be increased. By increasing the degree of constant volume of the opposed-piston engine 1, it is possible to suppress a reduction in thermal efficiency of the opposed-piston engine 1.

In some embodiments, as shown in FIGS. 2 and 4, the top surface 31 of the scavenging-side piston 3 includes the scavenging-side cavity 6 and the scavenging-side outer peripheral edge portion 32. According to the above configuration, the top surface 31 of the scavenging-side piston 3 has the scavenging-side cavity 6 in the central portion, and the scavenging-side outer peripheral edge portion 32 is formed on the outer peripheral side of the scavenging-side cavity 6. In this case, the combustion flame in the scavenging-side cavity 6 is suppressed from reaching the outer peripheral portions 33, 43 of the scavenging-side piston 3 and the exhaust-side piston 4 through the space facing the scavenging-side outer peripheral edge portion 32, thereby reducing the heat load on the outer peripheral portions 33, 43 of the scavenging-side piston 3 and the exhaust-side piston 4.

In some embodiments, as shown in FIG. 4, the top surface 41 of the exhaust-side piston 4 includes the exhaust-side cavity 7 and the exhaust-side outer peripheral edge portion 42. According to the above configuration, the top surface 41 of the exhaust-side piston 4 has the exhaust-side cavity 7 in the central portion, and the exhaust-side outer peripheral edge portion 42 is formed on the outer peripheral side of the exhaust-side cavity 7. In this case, the combustion flame in the exhaust-side cavity 7 is suppressed from reaching the outer peripheral portions 33, 43 of the scavenging-side piston 3 and the exhaust-side piston 4 through the space facing the exhaust-side outer peripheral edge portion 42, thereby reducing the heat load on the outer peripheral portions 33, 43 of the scavenging-side piston 3 and the exhaust-side piston 4.

In some embodiments, as shown in FIG. 4, the at least one fuel injection device 5 includes the above-described scavenging-side fuel injection device 5A and an exhaust-side fuel injection device 5B having the central axis CA2 inclined to the exhaust side (the other side in the axial direction of the cylinder 2) toward the inner side in the radial direction of the cylinder 2.

In the illustrated embodiment, the exhaust-side fuel injection device 5B is disposed on the inner surface 22 of the cylinder 2 so that the central axis CA2 is inclined with respect to the radial direction of the cylinder 2. The exhaust-side fuel injection device 5B injects fuel into the cylinder bore 21 along the extension direction of the central axis CA2. The extension direction of the central axis CA2 is directed to the central portion of the exhaust-side cavity 7.

Figure 5:
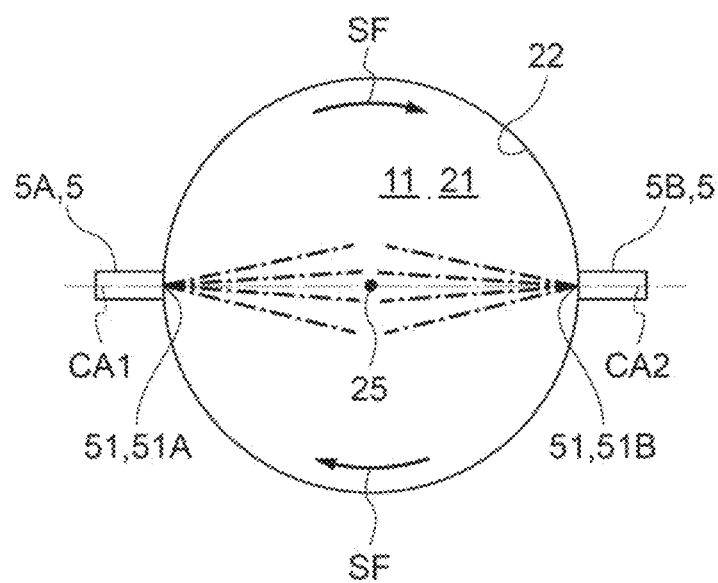
FIG. 5 is an explanatory diagram for describing a positional relationship between the scavenging-side fuel injection device and the exhaust-side fuel injection device.

FIG. 5 is an explanatory diagram for describing a positional relationship between the scavenging-side fuel injection device and the exhaust-side fuel injection device. In the illustrated embodiment, the exhaust-side fuel injection device 5B is offset from the scavenging-side fuel injection device 5A in the circumferential direction of the cylinder 2 so that they face each other across the axis 25 (the center of a cross-section of the inner surface 22 of the cylinder 2 in the direction perpendicular to the axial direction) of the cylinder 2. In this case, the interference between the combustion flame by the fuel injected from the scavenging-side fuel injection device 5A and the combustion flame by the fuel injected from the exhaust-side fuel injection device 5B can be suppressed, so that the fuel injected from the scavenging-side fuel injection device 5A and the exhaust-side fuel injection device 5B can be burned appropriately. In an embodiment, the exhaust-side fuel injection device 5B is offset from the scavenging-side fuel injection device 5A within 180°±5° in the circumferential direction of the cylinder 2.

According to the above configuration, the fuel injected from the exhaust-side fuel injection device 5B flows to the exhaust side (the other side in the axial direction) along the extension direction of the central axis CA2 of the exhaust-side fuel injection device 5B and burns in the exhaust-side cavity 7. The exhaust-side fuel injection device 5B allows fuel to be burned not only on the scavenging side of the combustion chamber 11 but also on the exhaust side, which allows fuel to be burned in a shorter time, so that the degree of constant volume of the opposed-piston engine 1 can be increased. By increasing the degree of constant volume of the opposed-piston engine 1, it is possible to suppress a reduction in thermal efficiency of the opposed-piston engine 1.

In some embodiments, in the opposed-piston engine as shown in FIG. 4, the scavenging-side fuel injection device 5A is configured to inject more fuel than the exhaust-side fuel injection device 5B.

The scavenging-side fuel injection device 5A and the exhaust-side fuel injection device 5B are configured to inject fuel by activation of an internal valve mechanism (not shown) by an electrical signal input or by activation of an internal valve mechanism (not shown) by fuel pressurized by a mechanical injection pump. In an embodiment, by adjusting the opening period of the valve mechanism of the scavenging-side fuel injection device 5A or the exhaust-side fuel injection device 5B, the fuel injection amount of the scavenging-side fuel injection device 5A or the exhaust-side fuel injection device 5B is adjusted. The opening period of the valve mechanism of the scavenging-side fuel injection device 5A or the exhaust-side fuel injection device 5B may be adjusted by an engine control unit 18 of the opposed-piston engine 1. By increasing the opening period of the valve mechanism, the fuel injection amount can be increased.

In an embodiment, the engine control unit 18 controls the fuel pressure of the scavenging-side fuel injection device 5A or the exhaust-side fuel injection device 5B instead of the opening period of the valve mechanism. By making the fuel pressure of the scavenging-side fuel injection device 5A higher than that of the exhaust-side fuel injection device 5B, the fuel injection amount of the scavenging-side fuel injection device 5A can be greater than that of the exhaust-side fuel injection device 5B.

In an embodiment, by making the hole diameter of the injection hole 51A of the scavenging-side fuel injection device 5A larger than the hole diameter of the injection hole 51B of the exhaust-side fuel injection device 5B, the fuel injection amount of the scavenging-side fuel injection device 5A can be greater than that of the exhaust-side fuel injection device 5B.

According to the above configuration, the scavenging-side fuel injection device 5A and the exhaust-side fuel injection device 5B inject more fuel to the scavenging side of the combustion chamber 11 than to the exhaust side of the combustion chamber 11, so that the fuel can be burned mainly on the scavenging side of the combustion chamber 11, which reduces the heat load on the exhaust-side piston 4.

The present disclosure is not limited to the embodiments described above, but includes modifications to the embodiments described above, and embodiments composed of combinations of those embodiments.

The contents described in the above embodiments would be understood as follows, for instance.

1) An opposed-piston engine (1) according to at least one embodiment of the present disclosure includes: a cylinder (2) having a scavenging port (23) on one side in an axial direction and an exhaust port (24) on another side in the axial direction; a scavenging-side piston (3) disposed inside the cylinder (2) on the one side in the axial direction; an exhaust-side piston (4) disposed inside the cylinder (2) on the other side in the axial direction; and at least one fuel injection device (5) configured to inject fuel between the scavenging-side piston (3) and the exhaust-side piston (4) inside the cylinder (2). A top surface (41) of the exhaust-side piston (4) is formed in a flat shape, a top surface (31) of the scavenging-side piston (3) has a scavenging-side cavity (6) with a predetermined cavity volume, and the at least one fuel injection device (5) includes a scavenging-side fuel injection device (5A) having a central axis (CA1) inclined to the one side in the axial direction toward an inner side in a radial direction of the cylinder (2).

According to the above configuration 1), the top surface (41) of the exhaust-side piston (4) is formed in a flat shape, and the top surface (31) of the scavenging-side piston (3) has the scavenging-side cavity (6) with a predetermined cavity volume. Therefore, the combustion chamber (11) formed between the scavenging-side piston (3) and the exhaust-side piston (4) has a larger volume on the scavenging side than on the exhaust side. The fuel injected from the scavenging-side fuel injection device (5A) flows to the scavenging side (one side in the axial direction) along the central axis (CA1) of the scavenging-side fuel injection device (5A) and burns in the scavenging-side cavity (6). By burning the fuel mainly on the scavenging side of the combustion chamber (11), the heat load on the exhaust-side piston (4) can be reduced. Further, since the top surface (41) of the exhaust-side piston (4) is formed in a flat shape, the heat input from the combustion chamber (11) to the top surface (41) of the exhaust-side piston (4) can be reduced. As a result, it is possible to reduce the heat loss of combustion in the combustion chamber (11) and thus suppress a reduction in thermal efficiency of the opposed-piston engine (1).

2) An opposed-piston engine (1) according to at least one embodiment of the present disclosure includes: a cylinder (2) having a scavenging port (23) on one side in an axial direction and an exhaust port (24) on another side in the axial direction; a scavenging-side piston (3) disposed inside the cylinder (2) on the one side in the axial direction; an exhaust-side piston (4) disposed inside the cylinder (2) on the other side in the axial direction; and at least one fuel injection device (5) configured to inject fuel between the scavenging-side piston (3) and the exhaust-side piston (4) inside the cylinder (2). A top surface (41) of the exhaust-side piston (4) has an exhaust-side cavity (7) with a predetermined cavity volume, a top surface (31) of the scavenging-side piston (3) has a scavenging-side cavity (6) with a larger cavity volume than the exhaust-side cavity (7), and the at least one fuel injection device (5) includes at least one scavenging-side fuel injection device (5A) having a central axis (CA1) inclined to the one side in the axial direction toward an inner side in a radial direction of the cylinder (2).

According to the above configuration 2), the cavity volume of the scavenging-side cavity (6) is larger than the cavity volume of the exhaust-side cavity (7). Therefore, the combustion chamber (11) formed between the scavenging-side piston (3) and the exhaust-side piston (4) has a larger volume on the scavenging side than on the exhaust side. The fuel injected from the scavenging-side fuel injection device (5A) flows to the scavenging side (one side in the axial direction) along the central axis (CA1) of the scavenging-side fuel injection device (5A) and burns in the scavenging-side cavity (6). By burning the fuel mainly on the scavenging side of the combustion chamber (11), the heat load on the exhaust-side piston (4) can be reduced. Further, by forming the exhaust-side cavity (7) on the top surface (41) of the exhaust-side piston (4), compared to the case where the top surface (41) of the exhaust-side piston (4) has a flat shape, the fuel can be burned in a shorter time, so that the degree of constant volume of the opposed-piston engine (1) can be increased. By increasing the degree of constant volume of the opposed-piston engine (1), it is possible to suppress a reduction in thermal efficiency of the opposed-piston engine (1).

3) In some embodiments, in the opposed-piston engine (1) described in the above 2), the exhaust-side cavity (7) is formed recessed in a central portion of the top surface (41) of the exhaust-side piston (4), and the top surface (41) of the exhaust-side piston (4) includes an exhaust-side outer peripheral edge portion (42) extending from an outer peripheral edge (71) of the exhaust-side cavity (7) toward an outer peripheral side along a direction perpendicular to the axial direction.

According to the above configuration 3), the top surface (41) of the exhaust-side piston (4) has the exhaust-side cavity (7) in the central portion, and the exhaust-side outer peripheral edge portion (42) is formed on the outer peripheral side of the exhaust-side cavity (7). In this case, the combustion flame in the exhaust-side cavity (7) is suppressed from reaching the outer peripheral portions (33, 43) of the scavenging-side piston (3) and the exhaust-side piston (4) through the space facing the exhaust-side outer peripheral edge portion (42), thereby reducing the heat load on the outer peripheral portions (33, 43) of the scavenging-side piston (3) and the exhaust-side piston (4).

4) In some embodiments, in the opposed-piston engine (1) described in any one of the above 1) to 3), the scavenging-side cavity (6) is formed recessed in a central portion of the top surface (31) of the scavenging-side piston (3), and the top surface (31) of the scavenging-side piston (3) includes a scavenging-side outer peripheral edge portion (32) extending from an outer peripheral edge (61) of the scavenging-side cavity (6) toward an outer peripheral side along a direction perpendicular to the axial direction.

According to the above configuration 4), the top surface (31) of the scavenging-side piston (3) has the scavenging-side cavity (6) in the central portion, and the scavenging-side outer peripheral edge portion (32) is formed on the outer peripheral side of the scavenging-side cavity (6). In this case, the combustion flame in the scavenging-side cavity (6) is suppressed from reaching the outer peripheral portions (33, 43) of the scavenging-side piston (3) and the exhaust-side piston (4) through the space facing the scavenging-side outer peripheral edge portion (32), thereby reducing the heat load on the outer peripheral portions (33, 43) of the scavenging-side piston (3) and the exhaust-side piston (4).

5) In some embodiments, in the opposed-piston engine (1) described in any one of the above 1) to 4), the at least one fuel injection device (5) further includes an exhaust-side fuel injection device (5B) having a central axis (CA2) inclined to the other side in the axial direction toward an inner side in the radial direction of the cylinder (2).

According to the above configuration 5), the fuel injected from the exhaust-side fuel injection device (5B) flows to the exhaust side (the other side in the axial direction) along the extension direction of the central axis (CA2) of the exhaust-side fuel injection device (5B) and burns in the exhaust-side cavity (7). The exhaust-side fuel injection device (5B) allows fuel to be burned not only on the scavenging side of the combustion chamber (11) but also on the exhaust side, which allows fuel to be burned in a shorter time, so that the degree of constant volume of the opposed-piston engine (1) can be increased. By increasing the degree of constant volume of the opposed-piston engine (1), it is possible to suppress a reduction in thermal efficiency of the opposed-piston engine (1).

6) In some embodiments, in the opposed-piston engine (1) described in the above 5), the at least one scavenging-side fuel injection device (5A) is configured to inject more fuel than the at least one exhaust-side fuel injection device (5B).

According to the above configuration 6), the scavenging-side fuel injection device (5A) and the exhaust-side fuel injection device (5B) inject more fuel to the scavenging side of the combustion chamber (11) than to the exhaust side of the combustion chamber (11), so that the fuel can be burned mainly on the scavenging side of the combustion chamber (11), which reduces the heat load on the exhaust-side piston (4).

REFERENCE SIGNS LIST 1, 01 Opposed-piston engine
2 Cylinder
3, 03 Scavenging-side piston
4, 04 Exhaust-side piston
5 Fuel injection device
5A Scavenging-side fuel injection device
5B Exhaust-side fuel injection device
6 Scavenging-side cavity
7 Exhaust-side cavity
11 Combustion chamber
12 Scavenging-side piston pin
13 Exhaust-side piston pin
14 Scavenging-side connecting rod
15 Exhaust-side connecting rod
16 Crankshaft
17 Rotational shaft
18 Engine control unit
21 Cylinder bore
22 Inner surface
23 Scavenging port 24 Exhaust port
25 Axis
31, 031, 41, 041 Top surface
32 Scavenging-side outer peripheral edge portion
33, 43 Outer peripheral portion
41A Flat surface
42 Exhaust-side outer peripheral edge portion
51, 51A, 51B Injection hole
61, 71 Outer peripheral edge
62, 72 Concave curved surface
63, 73 Virtual surface
CA1, CA2 Central axis
CG Combustion gas
EG Exhaust gas
F Fuel
SF Swirl flow

The invention claimed is:

1. An opposed-piston engine, comprising:
a cylinder having a scavenging port on one side in an axial direction and an exhaust port on another side in the axial direction;
a scavenging-side piston disposed inside the cylinder on the one side in the axial direction;
an exhaust-side piston disposed inside the cylinder on the other side in the axial direction; and
at least one fuel injection device configured to inject fuel between the scavenging-side piston and the exhaust-side piston inside the cylinder,
wherein a top surface of the exhaust-side piston has an exhaust-side cavity with a predetermined cavity volume,
wherein a top surface of the scavenging-side piston has a scavenging-side cavity with a larger cavity volume than the exhaust-side cavity, and
wherein the at least one fuel injection device includes a scavenging-side fuel injection device having a central axis inclined to the one side in the axial direction toward an inner side in a radial direction of the cylinder,
wherein the exhaust-side cavity is formed recessed in a central portion of the top surface of the exhaust-side piston,
wherein the top surface of the exhaust-side piston includes an exhaust-side outer peripheral edge portion extending from an outer peripheral edge of the exhaust-side cavity toward an outer peripheral side along a direction perpendicular to the axial direction,
wherein the scavenging-side cavity is formed recessed in a central portion of the top surface of the scavenging-side piston,
wherein the top surface of the scavenging-side piston includes a scavenging-side outer peripheral edge portion extending from an outer peripheral edge of the scavenging-side cavity toward an outer peripheral side along a direction perpendicular to the axial direction, and
wherein the scavenging-side fuel injection device is configured to inject the fuel from between the exhaust-side outer peripheral edge portion and the scavenging-side outer peripheral edge portion facing the exhaust-side outer peripheral edge portion.

2. The opposed-piston engine according to claim 1,
wherein the at least one fuel injection device further includes an exhaust-side fuel injection device having a central axis inclined to the other side in the axial direction toward an inner side in the radial direction of the cylinder.

3. The opposed-piston engine according to claim 2,
wherein the scavenging-side fuel injection device is configured to inject more fuel than the exhaust-side fuel injection device.

* * * * *